US008109513B2

(12) United States Patent
Jubinville et al.

(10) Patent No.: US 8,109,513 B2
(45) Date of Patent: Feb. 7, 2012

(54) LOTTERY GAME PLAYED ON A GEOMETRIC FIGURE USING INDICIA WITH VARIABLE POINT VALUES

(75) Inventors: Chantal Jubinville, Hoboken, NJ (US); Stephen G. Penrice, Morristown, NJ (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 12/791,557

(22) Filed: Jun. 1, 2010

(65) Prior Publication Data

US 2010/0301555 A1 Dec. 2, 2010

Related U.S. Application Data

(62) Division of application No. 11/258,545, filed on Oct. 25, 2005, now Pat. No. 7,726,652.

(60) Provisional application No. 60/622,982, filed on Oct. 28, 2004.

(51) Int. Cl.
*A63F 1/18* (2006.01)
*A63F 13/00* (2006.01)

(52) U.S. Cl. .......... 273/139; 273/138.1; 463/20; 463/18

(58) Field of Classification Search .................. 273/139, 273/292; 463/13
See application file for complete search history.

(56) References Cited

U.S. PATENT DOCUMENTS

| | | | |
|---|---|---|---|
| 1,527,929 | A | 2/1925 | Simons |
| 3,089,123 | A | 5/1963 | Hennis et al. |
| 3,245,697 | A | 4/1966 | Nugent |
| 3,699,311 | A | 10/1972 | Dunbar |
| 3,736,368 | A | 5/1973 | Vogelman et al. |
| 3,826,499 | A | 7/1974 | Lenkoff |
| 3,868,057 | A | 2/1975 | Chavez |
| 3,876,865 | A | 4/1975 | Bliss |
| 3,902,253 | A | 9/1975 | Sabuzawa et al. |
| 3,918,174 | A | 11/1975 | Miller et al. |
| 3,922,529 | A | 11/1975 | Orloff |
| 3,934,120 | A | 1/1976 | Maymarev |
| 4,017,834 | A | 4/1977 | Cuttill et al. |
| 4,095,824 | A | 6/1978 | Bachman |
| 4,105,156 | A | 8/1978 | Dethloff |
| 4,176,406 | A | 11/1979 | Matkan |
| 4,191,376 | A | 3/1980 | Goldman et al. |
| 4,194,296 | A | 3/1980 | Pagnozzi et al. |
| 4,195,772 | A | 4/1980 | Nishimura |
| 4,206,920 | A | 6/1980 | Weatherford et al. |
| 4,241,942 | A | 12/1980 | Bachman |
| 4,243,216 | A | 1/1981 | Mazumder |

(Continued)

FOREIGN PATENT DOCUMENTS

| | | |
|---|---|---|
| AU | 529535 | 6/1983 |

(Continued)

*Primary Examiner* — Alvin Hunter
*Assistant Examiner* — Michael Dennis
(74) *Attorney, Agent, or Firm* — Dority & Manning, P.A.

(57) ABSTRACT

A system, method and lottery ticket that implement a lottery game that uses a geometric figure having a plurality of selection spaces from which a player selects at least one selection space. The selection spaces are then populated with one or more game indicia, with each game indicia having a point value, and prizes are awarded based upon the total number of points associated with the game indicia populated into the player-selected selection spaces. Other lottery games can also be played simultaneously therewith on the same ticket or round of play.

5 Claims, 4 Drawing Sheets

U.S. PATENT DOCUMENTS

| | | | |
|---|---|---|---|
| 4,273,362 | A | 6/1981 | Carrier et al. |
| 4,309,452 | A | 1/1982 | Sachs |
| 4,313,087 | A | 1/1982 | Weitzen et al. |
| 4,355,300 | A | 10/1982 | Weber |
| 4,375,666 | A | 3/1983 | Buck et al. |
| 4,398,708 | A | 8/1983 | Goldman et al. |
| 4,407,443 | A | 10/1983 | McCorkle |
| 4,451,759 | A | 5/1984 | Heynisch |
| 4,455,039 | A | 6/1984 | Weitzen et al. |
| 4,457,430 | A | 7/1984 | Darling et al. |
| 4,464,423 | A | 8/1984 | LaBianca et al. |
| 4,466,614 | A | 8/1984 | Bachman et al. |
| 4,488,646 | A | 12/1984 | McCorkle |
| 4,491,319 | A | 1/1985 | Nelson |
| 4,494,197 | A | 1/1985 | Troy et al. |
| 4,536,218 | A | 8/1985 | Ganho |
| 4,544,184 | A | 10/1985 | Freund et al. |
| 4,579,371 | A | 4/1986 | Long et al. |
| 4,591,189 | A | 5/1986 | Holmen et al. |
| 4,634,149 | A | 1/1987 | Donovan |
| 4,665,502 | A | 5/1987 | Kreisner |
| 4,669,729 | A | 6/1987 | Solitt et al. |
| 4,689,742 | A | 8/1987 | Troy et al. |
| 4,726,608 | A | 2/1988 | Walton |
| 4,736,109 | A | 4/1988 | Dvorzsak |
| 4,740,016 | A | 4/1988 | Konecny et al. |
| 4,760,247 | A | 7/1988 | Keane et al. |
| 4,763,927 | A | 8/1988 | Schneider |
| 4,775,155 | A | 10/1988 | Lees |
| 4,792,667 | A | 12/1988 | Chen |
| 4,805,907 | A | 2/1989 | Hagiwara |
| 4,817,951 | A | 4/1989 | Crouch et al. |
| 4,835,624 | A | 5/1989 | Black et al. |
| 4,836,546 | A | 6/1989 | Dire et al. |
| 4,836,553 | A | 6/1989 | Suttle et al. |
| 4,837,728 | A | 6/1989 | Barrie et al. |
| 4,856,787 | A | 8/1989 | Itkis |
| 4,861,041 | A | 8/1989 | Jones et al. |
| 4,870,260 | A | 9/1989 | Niepolomski et al. |
| 4,880,964 | A | 11/1989 | Donahue |
| 4,888,964 | A | 12/1989 | Klinge |
| 4,922,522 | A | 5/1990 | Scanlon |
| 4,943,090 | A | 7/1990 | Fienberg |
| 4,960,611 | A | 10/1990 | Fujisawa et al. |
| 4,961,578 | A | 10/1990 | Chateau |
| 4,964,642 | A | 10/1990 | Kamille |
| 4,996,705 | A | 2/1991 | Entenmann et al. |
| 4,998,010 | A | 3/1991 | Chandler et al. |
| 4,998,199 | A | 3/1991 | Tashiro et al. |
| 5,032,708 | A | 7/1991 | Comerford et al. |
| 5,037,099 | A | 8/1991 | Burtch |
| 5,046,737 | A | 9/1991 | Fienberg |
| 5,074,566 | A | 12/1991 | Desbiens |
| 5,083,815 | A | 1/1992 | Scrymgeour et al. |
| 5,092,598 | A | 3/1992 | Kamille |
| 5,094,458 | A | 3/1992 | Kamille |
| 5,100,139 | A | 3/1992 | Di Bella |
| 5,109,153 | A | 4/1992 | Johnsen et al. |
| 5,112,050 | A | 5/1992 | Koza et al. |
| 5,116,049 | A | 5/1992 | Sludikoff et al. |
| 5,118,109 | A | 6/1992 | Gumina |
| 5,119,295 | A | 6/1992 | Kapur |
| 5,158,293 | A | 10/1992 | Mullins |
| 5,165,967 | A | 11/1992 | Theno et al. |
| 5,186,463 | A | 2/1993 | Marin et al. |
| 5,189,292 | A | 2/1993 | Batterman et al. |
| 5,193,815 | A | 3/1993 | Pollard |
| 5,193,854 | A | 3/1993 | Borowski, Jr. et al. |
| 5,228,692 | A | 7/1993 | Carrick et al. |
| 5,232,221 | A | 8/1993 | Sludikoff et al. |
| 5,234,798 | A | 8/1993 | Heninger et al. |
| 5,249,801 | A | 10/1993 | Jarvis |
| 5,259,616 | A | 11/1993 | Bergmann |
| 5,273,281 | A | 12/1993 | Lovell |
| 5,276,980 | A | 1/1994 | Carter et al. |
| 5,282,620 | A | 2/1994 | Keesee |
| 5,308,992 | A | 5/1994 | Crane et al. |
| 5,317,135 | A | 5/1994 | Finocchio |
| 5,326,104 | A | 7/1994 | Pease et al. |
| 5,332,219 | A | 7/1994 | Marnell, II et al. |
| 5,342,047 | A | 8/1994 | Heidel et al. |
| 5,342,049 | A | 8/1994 | Wichinsky et al. |
| 5,344,144 | A | 9/1994 | Canon |
| 5,346,258 | A | 9/1994 | Behm et al. |
| 5,380,007 | A | 1/1995 | Travis et al. |
| 5,393,057 | A | 2/1995 | Marnell, II et al. |
| 5,401,024 | A | 3/1995 | Simunek |
| 5,401,541 | A | 3/1995 | Hodnett |
| 5,403,039 | A | 4/1995 | Borowski, Jr. et al. |
| 5,407,199 | A | 4/1995 | Gumina |
| 5,420,406 | A | 5/1995 | Izawa et al. |
| 5,432,005 | A | 7/1995 | Tanigami et al. |
| 5,451,052 | A | 9/1995 | Behm et al. |
| 5,456,465 | A | 10/1995 | Durham |
| 5,456,602 | A | 10/1995 | Sakuma |
| 5,471,039 | A | 11/1995 | Irwin |
| 5,471,040 | A | 11/1995 | May |
| 5,475,205 | A | 12/1995 | Behm et al. |
| 5,486,005 | A | 1/1996 | Neal |
| 5,513,846 | A | 5/1996 | Niederlein et al. |
| 5,528,154 | A | 6/1996 | Leichner et al. |
| 5,536,016 | A | 7/1996 | Thompson |
| 5,540,442 | A | 7/1996 | Orselli et al. |
| 5,548,110 | A | 8/1996 | Storch et al. |
| 5,550,746 | A | 8/1996 | Jacobs |
| 5,560,610 | A | 10/1996 | Behm et al. |
| 5,564,700 | A | 10/1996 | Celona |
| 5,564,977 | A | 10/1996 | Algie |
| 5,591,956 | A | 1/1997 | Longacre, Jr. et al. |
| 5,599,046 | A | 2/1997 | Behm et al. |
| 5,602,381 | A | 2/1997 | Hoshino et al. |
| 5,621,200 | A | 4/1997 | Irwin et al. |
| 5,628,684 | A | 5/1997 | Bouedec |
| 5,630,753 | A | 5/1997 | Fuchs |
| 5,651,735 | A | 7/1997 | Baba |
| 5,655,961 | A | 8/1997 | Acres et al. |
| 5,667,250 | A | 9/1997 | Behm et al. |
| 5,682,819 | A | 11/1997 | Beatty |
| 5,690,366 | A | 11/1997 | Luciano |
| 5,704,647 | A | 1/1998 | Desbiens |
| 5,722,891 | A | 3/1998 | Inoue |
| 5,726,898 | A | 3/1998 | Jacobs |
| 5,732,948 | A | 3/1998 | Yoseloff |
| 5,741,183 | A | 4/1998 | Acres et al. |
| 5,743,800 | A | 4/1998 | Huard et al. |
| 5,752,882 | A | 5/1998 | Acres et al. |
| 5,756,220 | A | 5/1998 | Hoshino et al. |
| 5,768,142 | A | 6/1998 | Jacobs |
| 5,769,458 | A | 6/1998 | Carides et al. |
| 5,770,533 | A | 6/1998 | Franchi |
| 5,772,509 | A | 6/1998 | Weiss |
| 5,772,510 | A | 6/1998 | Roberts |
| 5,772,511 | A | 6/1998 | Smeltzer |
| RE35,864 | E | 7/1998 | Weingardt |
| 5,779,840 | A | 7/1998 | Boris |
| 5,789,459 | A | 8/1998 | Inagaki et al. |
| 5,791,990 | A | 8/1998 | Schroeder et al. |
| 5,797,794 | A | 8/1998 | Angell |
| 5,803,504 | A | 9/1998 | Deshiens et al. |
| 5,816,920 | A | 10/1998 | Hanai |
| 5,818,019 | A | 10/1998 | Irwin, Jr. et al. |
| 5,820,459 | A | 10/1998 | Acres et al. |
| 5,823,874 | A | 10/1998 | Adams |
| 5,830,063 | A | 11/1998 | Byrne |
| 5,830,066 | A | 11/1998 | Goden et al. |
| 5,830,067 | A | 11/1998 | Graves et al. |
| 5,833,537 | A | 11/1998 | Barrie |
| 5,835,576 | A | 11/1998 | Katz et al. |
| 5,836,086 | A | 11/1998 | Elder |
| 5,836,817 | A | 11/1998 | Acres et al. |
| 5,848,932 | A | 12/1998 | Adams |
| 5,863,075 | A | 1/1999 | Rich et al. |
| 5,871,398 | A | 2/1999 | Schneier et al. |
| 5,876,284 | A | 3/1999 | Acres et al. |
| 5,882,261 | A | 3/1999 | Adams |
| 5,883,537 | A | 3/1999 | Luoni et al. |
| 5,885,158 | A | 3/1999 | Torango et al. |

| | | | | |
|---|---|---|---|---|
| 5,887,906 | A | 3/1999 | Sultan | |
| 5,903,340 | A | 5/1999 | Lawandy et al. | |
| 5,911,418 | A | 6/1999 | Adams | |
| 5,915,588 | A | 6/1999 | Stoken et al. | |
| 5,934,671 | A | 8/1999 | Harrison | |
| 5,970,143 | A | 10/1999 | Schneier et al. | |
| 5,979,894 | A | 11/1999 | Alexoff | |
| 5,996,997 | A | 12/1999 | Kamille | |
| 5,997,044 | A | 12/1999 | Behm et al. | |
| 6,003,307 | A | 12/1999 | Naber et al. | |
| 6,004,207 | A | 12/1999 | Wilson, Jr. et al. | |
| 6,004,208 | A | 12/1999 | Takemoto et al. | |
| 6,007,162 | A | 12/1999 | Hinz et al. | |
| 6,012,982 | A | 1/2000 | Piechowiak et al. | |
| 6,014,032 | A | 1/2000 | Maddix et al. | |
| 6,017,032 | A | 1/2000 | Grippo et al. | |
| 6,024,641 | A | 2/2000 | Sarno | |
| 6,053,405 | A | 4/2000 | Irwin, Jr. et al. | |
| 6,077,162 | A | 6/2000 | Weiss | |
| 6,080,062 | A | 6/2000 | Olson | |
| 6,086,477 | A | 7/2000 | Walker et al. | |
| 6,089,978 | A | 7/2000 | Adams | |
| 6,099,407 | A | 8/2000 | Parker, Jr. et al. | |
| 6,102,400 | A | 8/2000 | Scott et al. | |
| 6,107,913 | A | 8/2000 | Gatto et al. | |
| 6,119,364 | A | 9/2000 | Elder | |
| 6,125,368 | A | 9/2000 | Bridge et al. | |
| 6,142,872 | A | 11/2000 | Walker et al. | |
| 6,146,272 | A | 11/2000 | Walker et al. | |
| 6,149,521 | A | 11/2000 | Sanduski | |
| 6,155,491 | A | 12/2000 | Dueker et al. | |
| 6,168,521 | B1 | 1/2001 | Luciano et al. | |
| 6,168,522 | B1 | 1/2001 | Walker et al. | |
| 6,179,710 | B1 | 1/2001 | Sawyer et al. | |
| 6,203,430 | B1 | 3/2001 | Walker et al. | |
| 6,206,373 | B1 | 3/2001 | Garrod | |
| 6,210,275 | B1 | 4/2001 | Olsen | |
| 6,217,448 | B1 | 4/2001 | Olsen | |
| 6,220,596 | B1 | 4/2001 | Horan | |
| 6,220,961 | B1 | 4/2001 | Keane et al. | |
| 6,224,055 | B1 | 5/2001 | Walker et al. | |
| 6,227,969 | B1 | 5/2001 | Yoseloff | |
| 6,238,288 | B1 | 5/2001 | Walker et al. | |
| 6,277,025 | B1 * | 8/2001 | Margolin | 463/18 |
| 6,309,300 | B1 | 10/2001 | Glavich | |
| 6,312,334 | B1 | 11/2001 | Yoseloff | |
| 6,315,291 | B1 | 11/2001 | Moody | |
| 6,330,976 | B1 | 12/2001 | Dymetman et al. | |
| 6,331,143 | B1 | 12/2001 | Yoseloff | |
| 6,334,814 | B1 | 1/2002 | Adams | |
| 6,340,158 | B2 | 1/2002 | Pierce et al. | |
| 6,368,213 | B1 | 4/2002 | McNabola | |
| 6,375,568 | B1 | 4/2002 | Roffman et al. | |
| 6,379,742 | B1 | 4/2002 | Behm et al. | |
| 6,394,899 | B1 | 5/2002 | Walker | |
| 6,398,214 | B1 | 6/2002 | Moteki et al. | |
| 6,398,643 | B1 | 6/2002 | Knowles et al. | |
| 6,398,644 | B1 | 6/2002 | Perrie et al. | |
| 6,398,645 | B1 | 6/2002 | Yoseloff | |
| 6,416,408 | B2 | 7/2002 | Tracy et al. | |
| 6,419,579 | B1 | 7/2002 | Bennett | |
| 6,435,408 | B1 | 8/2002 | Irwin, Jr. et al. | |
| 6,435,500 | B2 | 8/2002 | Gumina | |
| 6,478,677 | B1 | 11/2002 | Moody | |
| 6,491,215 | B1 | 12/2002 | Irwin, Jr. et al. | |
| 6,497,408 | B1 | 12/2002 | Walker et al. | |
| 6,552,290 | B1 | 4/2003 | Lawandy | |
| 6,588,747 | B1 | 7/2003 | Seelig | |
| 6,599,186 | B1 | 7/2003 | Walker et al. | |
| 6,601,772 | B1 | 8/2003 | Rubin et al. | |
| 6,637,747 | B1 | 10/2003 | Garrod | |
| 6,648,735 | B2 | 11/2003 | Miyashita et al. | |
| 6,648,753 | B1 | 11/2003 | Tracy et al. | |
| 6,648,755 | B1 | 11/2003 | Luciano et al. | |
| 6,676,126 | B1 | 1/2004 | Walker et al. | |
| 6,692,354 | B2 | 2/2004 | Tracy et al. | |
| 6,702,047 | B2 | 3/2004 | Huber | |
| 6,773,345 | B2 | 8/2004 | Walker et al. | |
| 6,776,337 | B2 | 8/2004 | Irwin, Jr. et al. | |
| 6,786,824 | B2 | 9/2004 | Cannon | |
| 6,823,874 | B2 | 11/2004 | Lexcen | |
| 6,875,105 | B1 | 4/2005 | Behm et al. | |
| 6,929,186 | B2 | 8/2005 | Lapstun | |
| 7,399,227 | B2 * | 7/2008 | Michaelson et al. | 463/18 |
| 2001/0027130 | A1 | 10/2001 | Namba et al. | |
| 2001/0030978 | A1 | 10/2001 | Holloway et al. | |
| 2001/0034262 | A1 | 10/2001 | Banyai | |
| 2001/0040345 | A1 | 11/2001 | Au-Yeung | |
| 2002/0022511 | A1 | 2/2002 | Eklund et al. | |
| 2002/0084327 | A1 | 7/2002 | Ehrhart et al. | |
| 2002/0084335 | A1 | 7/2002 | Ericson | |
| 2002/0171201 | A1 | 11/2002 | Au-Yeung | |
| 2002/0187825 | A1 | 12/2002 | Tracy et al. | |
| 2003/0050109 | A1 * | 3/2003 | Caro et al. | 463/17 |
| 2003/0114210 | A1 | 6/2003 | Meyer et al. | |
| 2004/0076310 | A1 | 4/2004 | Hersch et al. | |
| 2004/0119232 | A1 | 6/2004 | Kerr | |
| 2004/0173965 | A1 | 9/2004 | Stanek | |
| 2004/0178582 | A1 | 9/2004 | Garrod | |
| 2004/0185931 | A1 | 9/2004 | Lowell et al. | |
| 2004/0204222 | A1 | 10/2004 | Roberts | |
| 2004/0222586 | A1 | 11/2004 | Katz et al. | |
| 2004/0259631 | A1 | 12/2004 | Katz et al. | |
| 2004/0266514 | A1 | 12/2004 | Penrice | |
| 2006/0249897 | A1 * | 11/2006 | Jubinville et al. | 273/138.1 |

FOREIGN PATENT DOCUMENTS

| | | |
|---|---|---|
| AU | 529536 | 6/1983 |
| AU | B-18428/92 | 12/1992 |
| AU | B-21070/92 | 7/1993 |
| AU | A-50327/96 | 2/1997 |
| AU | B-52499/96 | 2/1997 |
| AU | 199716432 | 9/1997 |
| AU | A-45403/97 | 4/1998 |
| AU | A-63553/98 | 10/1998 |
| DE | 2938307 | 4/1981 |
| DE | 3035898 | 4/1982 |
| DE | 3035947 | 5/1982 |
| DE | 2938307 | 6/1982 |
| DE | 29803107 | 8/1988 |
| DE | 3822636 | 1/1990 |
| DE | 2938307 | 8/1990 |
| DE | 3822636 | 1/1992 |
| DE | 3415114 | 10/1995 |
| DE | 19646956 | 5/1998 |
| DE | 19706286 | 5/1998 |
| DE | 29816453 | 4/1999 |
| DE | 19751746 | 5/1999 |
| EP | 0122902 | 4/1984 |
| EP | 0333934 | 9/1989 |
| EP | 0458623 | 11/1991 |
| EP | 0798676 | 10/1997 |
| EP | 0799649 | 10/1997 |
| EP | 0149712 | 7/1998 |
| EP | 0874337 | 10/1998 |
| EP | 0896304 | 2/1999 |
| EP | 0914875 | 5/1999 |
| EP | 0919965 | 6/1999 |
| EP | 0983801 | 3/2000 |
| EP | 0983801 | 3/2001 |
| EP | 1149712 | 10/2001 |
| ES | 2006400 | 4/1989 |
| ES | 2006401 | 4/1989 |
| GB | 642892 | 9/1950 |
| GB | 2075918 | 11/1981 |
| GB | 2222712 | 3/1990 |
| GB | 2230373 | 10/1990 |
| GB | 2295775 | 12/1996 |
| GB | 3328311 | 2/1999 |
| GB | 23282311 | 2/1999 |
| JP | 02235744 | 9/1990 |
| JP | 04132672 | 5/1992 |
| WO | WO85/02250 | 5/1985 |
| WO | WO91/17529 | 11/1991 |
| WO | WO 98/03910 | 1/1998 |
| WO | WO 98/40138 | 9/1998 |

| | | |
|---|---|---|
| WO | WO 99/09364 | 2/1999 |
| WO | WO 99/26204 | 5/1999 |
| WO | WO 99/39312 | 8/1999 |
| WO | WO00/00256 | 1/2000 |
| WO | WO00/78418 | 12/2000 |
| WO | WO01/74460 | 11/2001 |
| WO | WO01/93966 | 12/2001 |
| WO | WO02/056266 | 7/2002 |

* cited by examiner

| Total number of points | Odds | Prize |
|---|---|---|
| 7 | 1 in 13,282.5 | $1,000 |
| 6 | 1 in 510.9 | $100 |
| 5 | 1 in 76.8 | $10 |
| 4 | 1 in 21.4 | $4 |
| 3 | 1 in 8.0 | $1 |

| | | PRIZE | |
|---|---|---|---|
| Total number of points | Odds | Multiplier for Base Game Prize | Cash |
| 7 | 1 in 13,282.5 | 8 X | $1,000 |
| 6 | 1 in 510.9 | 7 X | $50 |
| 5 | 1 in 76.8 | 6 X | $5 |
| 4 | 1 in 21.4 | 5 X | |
| 3 | 1 in 8.0 | 4 X | |
| 2 | 1 in 4.8 | 3 X | |
| 1 or less | 1 in 1.7 | 2 X | |

LOTTERY GAME PLAYED ON A GEOMETRIC FIGURE USING INDICIA WITH VARIABLE POINT VALUES

PRIORITY CLAIM

The present application is a Divisional Application from U.S. application Ser. No. 11/258,545, filed Oct. 25, 2005 now U.S. Pat. No. 7,726,652. The '545 application claims the benefit of U.S. Provisional Application Ser. No. 60/622,982, filed on Oct. 28, 2004, the entirety of which is hereby fully incorporated herein by this reference.

BACKGROUND OF THE INVENTION

1. Field of the Invention

The invention relates generally to a lottery game, and more particularly to a lottery game in which the player selects a plurality of positions within a geometric figure and in which some of the positions in the figure are subsequently populated with indicia.

2. Description of the Related Art

Many governments and/or gaming organizations sponsor wagering games known as lotteries. A typical lottery game entails players selecting permutations or combinations of numbers. This is followed by a "draw," wherein the lottery randomly selects a combination or permutation of numbered balls. Prizes are awarded based on the number of matches between a player's selection and the drawn numbers. The drawn numbers are then well-publicized, and large-jackpot lotteries are popular throughout the world.

Lotteries have become an important source of income to governments as they shoulder much of the financial burden for education and other programs. However, as governments have grown more dependent on and increased the use of lotteries, it has become a challenge to sustain public interest therein and maintain the desired level of game participation. One approach to invigorating lottery sales is to expand game content beyond traditional combination/permutation games in the hope that the new games will help keep current players, as well as draw in new players.

One method to enhance game play is to change game indicia from simple alphanumeric characters to other pictures and images. It is known to use pictures or other game indicia in the lottery game to create a unique prize structure. However, most of the variable game indicia lotteries still rely upon a matching of game indicia and drawn indicia to determine a prize through the correspondent level of matching.

Therefore, it would be advantageous to provide a lottery game that allows winning based upon more than simple number or symbol matching. Further, such lottery game should allow a variable prize structure that is greater than that permitted by pure matching of sets of symbols. It is thus to such an improved lottery game that the present invention is primarily directed.

SUMMARY OF THE INVENTION

The present invention overcomes some of the deficiencies of the lottery games know in the art, and provides new lottery game content in three ways. First, rather than requiring players to select a plurality of indicia from a large set of indicia, the invention allows players to select a plurality of positions from a geometric figure that will subsequently be populated with indicia from a possibly small set of indicia, possibly with repetition. Second, rather than being limited to the use of generic indicia such as numbers, the invention may use symbols, and possibly symbols related to a brand or other popular images with broad consumer appeal. Third, the indicia have point values associated with them so that the value of a player's ticket is determined by the total number of points associated with the indicia in the selected positions, in contrast to awarding prizes based only upon matching symbols.

The invention thus comprises a lottery game in which the player may select a plurality of positions within a geometric figure. Some or all of the positions in the figure are subsequently populated with game indicia having point values. Preferably, the game indicia are related but not limited to an identifiable brand that will appeal to players. The positions may be populated with the indicia either by the lottery system at the time the player's ticket is issued, or they may be populated with indicia as the result of a draw that is held at a predetermined time in which case the assignment of indicia to positions is common for all players. A player's prize is thus a function of the total number of points associated with the indicia in the positions selected by the player.

In one embodiment, the invention is a method for implementing a lottery game using a geometric figure having a plurality of selection spaces comprising the steps of allowing a player to select at least one selection space within the geometric figure, populating one more of the selection spaces with one or more game indicia, wherein each game indicia has a point value, and then awarding a prize based upon the total number of points associated with the game indicia in the player-selected selection spaces.

In one embodiment, the invention is a system for implementing a lottery game comprising at least one game server that implements the lottery game using a geometric figure having a plurality of selection spaces, and at least one dispensing terminal that allows a player to select at least one selection space within the geometric figure of the lottery game implemented by the game server. The game server further populates one more of the selection spaces with one or more game indicia, with each game indicia having a point value, and the game server further awards a prize to the player based upon the total number of points associated with the game indicia in the player-selected selection spaces.

The invention also includes a lottery game ticket including a geometric figure having a plurality of selection spaces that allows a player to select at least one selection space within the geometric figure, and allows one more of the selection spaces to be populated with one or more game indicia, with each game indicia having a point value. The lottery ticket allows a determination of a prize is based upon the total number of points associated with the game indicia in the player-selected selection spaces.

Other objects, features, and advantages of the present invention will become apparent after review of the hereinafter set forth Brief Description of the Drawings, the Detailed Description of the Invention, and the Claims.

DETAILED DESCRIPTION OF THE INVENTION

Figure 1:
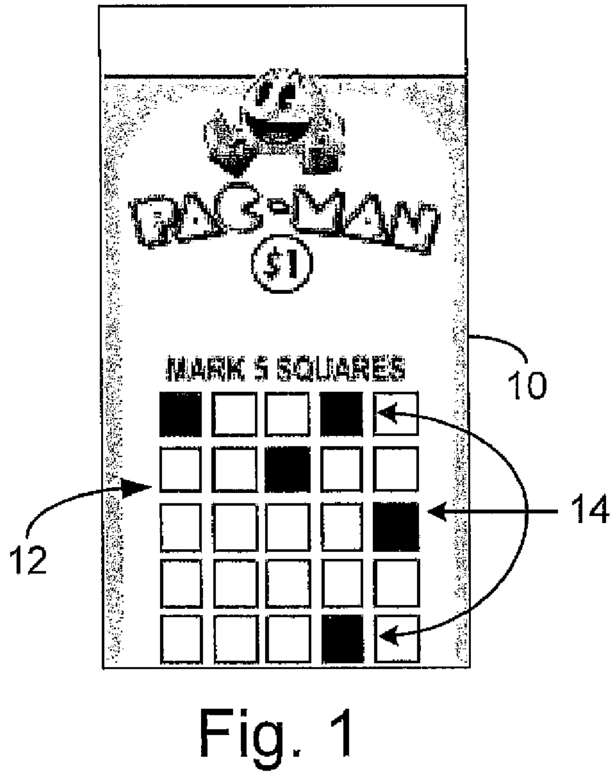
FIG. 1 is an illustration of one embodiment of a lottery game bet slip of the present invention using a geometric figure.

Referring now to the drawings, in a first embodiment of the inventive lottery game shown in FIG. 1, the player initiates a play of the game using a bet slip 10 that displays a geometric figure that comprises a plurality of cells 12. The player marks a subset 14 of these cells to indicate his selection for the game and then submits the bet slip 10 along with an amount of money to an authorized lottery retailer, as known in the art, who will enter the information into a terminal (such as game terminal 54 in FIG. 7) connected to the lottery's central system. Alternatively, the lottery may offer self-serve kiosks where the player may indicate his selections, either with a bet slip 10 or touch-screen technology if provided by the kiosk, and submit the money though a bill collector on the machine, as is known in the art.

After the lottery system accepts the wager, it prints a ticket 20 (FIG. 2) indicating the player's selection. In one embodiment of the invention, the lottery may also print indicia on the ticket. Each indicium has a point value associated therewith. The player adds the points associated with the indicia that appear in the selected cells and compares the point total to a prize table that indicates what prize, if any, corresponds to that point value. If the point value on the ticket does correspond to a prize, the player submits the ticket to a retailer or to a self-service kiosk for ticket validation and prize payment.

In an alternate embodiment, the ticket displays the player's selection but does not indicate the placement of the indicia in the geometric figure. In this embodiment, a drawing is held after sales are discontinued, the drawing comprising a selection of cells, without replacement, for each indicium in the set of indicia. The point value of the player's ticket can then be determined and the ticket validated as described above.

Figure 2:
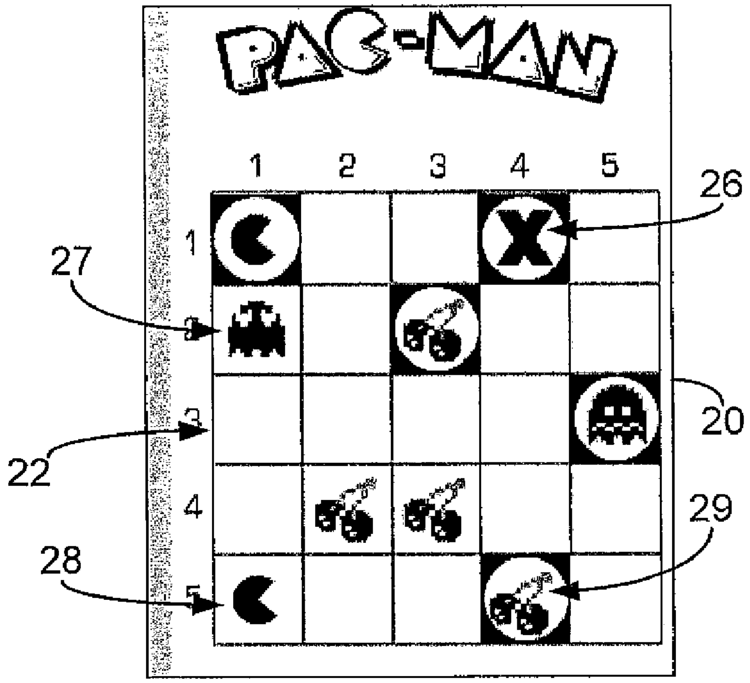
FIG. 2 is an illustration of one embodiment of a ticket for the lottery game entered by the bet slip of FIG. 1.

A sample embodiment of this invention is described as follows. The player chooses five positions from a 5.times.5 square grid 12 using a bet slip 10 as shown in FIGS. 1 and 2. The indicia for this embodiment comprise images from the arcade game Pac-Man®. Specifically they are two instances 28 of Pac-Man®, worth two points each, four instances of a pair of cherries 29, worth one point each, and two instances of ghosts 27, worth negative one (−1) point each. Note that this implies that the populated grid 22 will have seventeen blank spaces, which have no point value. In this embodiment, the assignment of indicia to positions on the grid occurs immediately.

Figures 5, 6:
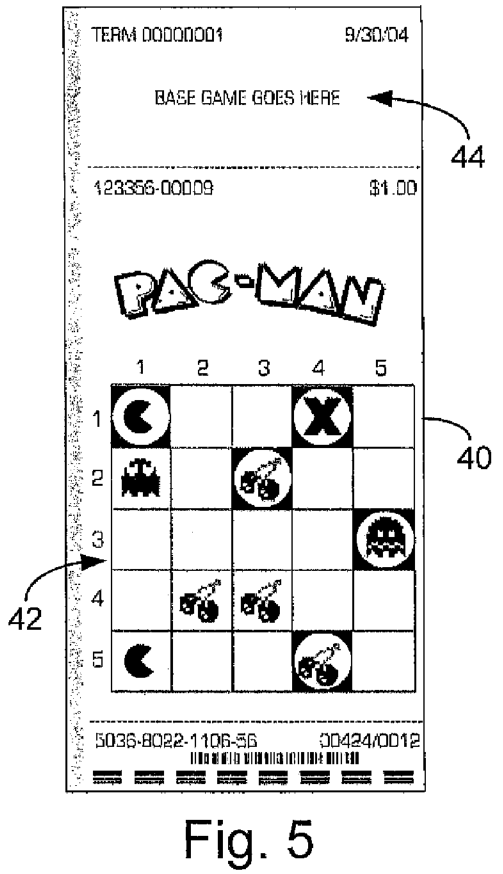
FIG. 5 is an illustration of another embodiment of a ticket for the lottery game entered by the bet slip of FIG. 4.
FIG. 6 depicts a second exemplary prize table for the lottery game.

Using a random number generator, as known in the art, the lottery system assigns the indicia to a 5.times.5 grid. The system then issues a ticket that displays the grid, the indicia and the player's selected positions. As shown in FIGS. 2 and 5, an "X" is used to indicate a position selected by the player that was not assigned an indicium. FIG. 2 shows as a sample ticket for this embodiment in which the player's selected cells contain one Pac-Man® 28, two pairs of cherries 29 and one ghost 27, with one missed space 26. The player's ticket 20 has therefore earned a total of three points.

Figures 3, 4:
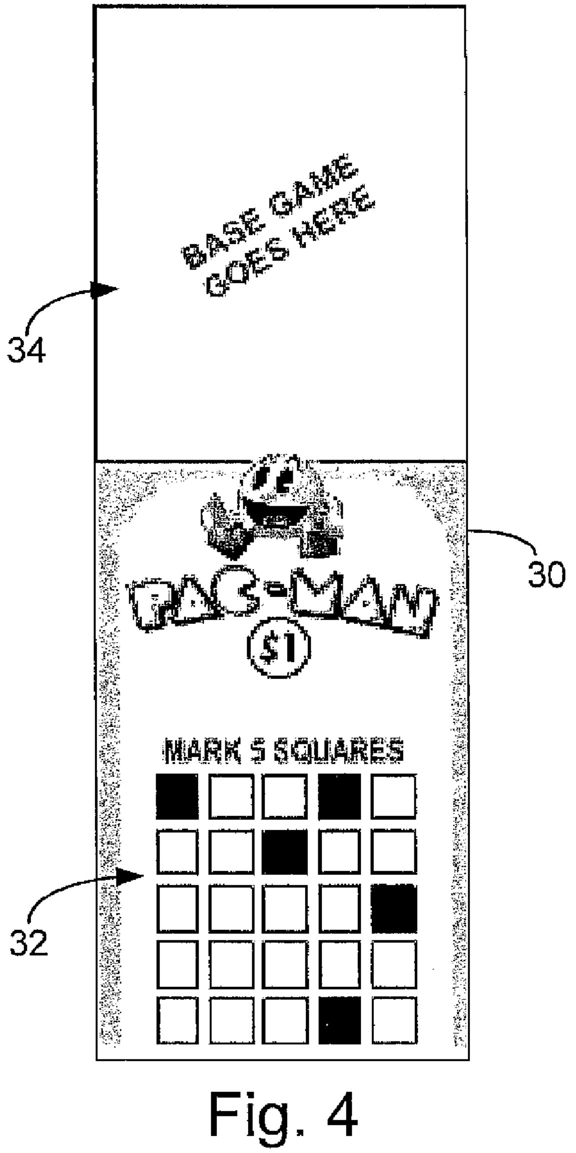
FIG. 3 depicts an exemplary prize table for the lottery game.
FIG. 4 is an illustration of another embodiment of a lottery game bet slip of the present invention.

FIG. 3 shows a prize table for this embodiment of the lottery game. After the players determine the point value of their ticket, they may use the prize table to determine if they have won a prize and, if so, the magnitude of the prize. In this example, the player has won $1.

In assigning indicia to positions on the geometric figure/grid, the lottery system may randomly select and populate the positions (typically via a randomized algorithm or a drawing) or it may use the method of reverse mapping, i.e. it may randomly determine the number of points that the player will earn first and then assign the indicia to the positions so as to effect a ticket that has the selected point value. Other methods as known in the art to automatically populate the indicia in a "quick pick" manner can be used herein. The odds shown in the table in FIG. 3 assume the former method. Moreover, in an alternate embodiment where the indicia are assigned to the positions by means of a draw, these odds must be calculated so that the lottery can determined its expected prize liability and players can understand their chances of winning.

The following example shows how the odds may be computed in the case where indicia are randomly assigned to positions. Consider the event where a ticket earns exactly six points. This can happen in one of two ways: a) the player's selected positions contain two Pac-Man® symbols 28, two pairs of cherries 29, zero ghosts 27 and one blank space or b) the player's selected positions contain one Pac-Man® symbol 28, four pairs of cherries 29, zero ghosts 27 and zero blank spaces. Under the assumption that the indicia are placed on the geometric figure randomly, the probability of each case can be computed as follows:

$$a)\frac{\binom{2}{2}\binom{4}{2}\binom{2}{0}\binom{17}{1}}{\binom{25}{5}} \approx 0.00192$$

$$b)\frac{\binom{2}{1}\binom{4}{4}\binom{2}{0}\binom{17}{0}}{\binom{25}{5}} \approx 0.000038$$

Thus the total probability of earning six points is 0.001957, or approximately 1 in 510.9.

Note that in general, if k objects are selected from a set S of cardinality n that is partitioned into subsets $S_1, S_2, \ldots, S_m$ with cardinalities $n_1, n_2, \ldots, n_m$, respectively, then for nonnegative integers $k_1, k_2, \ldots, k_m$ with $k_1+k_2 \ldots +k_m=k$, the probability that exactly $k_i$ of the objects are from $S_1$ for i=1, . . . , $$m \text{ is } \frac{\binom{n_1}{k_1}\binom{n_2}{k_2}\cdots\binom{n_m}{k_m}}{\binom{n}{k}}$$

where $$\binom{i}{j}$$

denotes a binomial coefficient and by convention $$\binom{i}{j} = 0 \text{ if } i < j.$$

The computation of these odds is facilitated by a method of automatically generating a list of all possible ways of expressing a positive integer n as an ordered sum of k nonnegative integers. For example, in the calculations above one may make use of a list of all the possible ways of writing 5 as a sum of four nonnegative integers, where order matters, i.e. 0+2+2+1 is distinct from 2+1+0+2. It is well known within combinatorial mathematics that these can be put in one-to-one correspondence with (k−1)-element subsets of a (n+k−1)-element set; see for example pp. 14-15 of Stanley's *Enumerative Combinatorics*, Vol. 1. Methods for generating all such subsets are also well-known; see pp. 43-52 of Kreher and Stinson's *Combinatorial Mathematics: Generation, Enumeration, and Search.*

The foregoing sample embodiment is for a stand-alone lottery game. The invention may also be embodied as an "extension game." Specifically, the game may be offered for sale only in combination with another lottery game, referred to here as the "base game." When embodied as an extension game, the prize table may include multiplier values as prizes. When a player wins a multiplier prize, say, for example 3×, one or more prizes that he wins in the base game may be multiplied by the multiplier value.

When embodied as an extension game, the prize table may include multiplier values as prizes. When a player wins a multiplier prize, say, for example 3×, one or more prizes that he wins in the base game may be multiplied by the multiplier value. The present invention may be embodied as an extension game, that is, a lottery game that can only be played in conjunction with another lottery game, referred to as the "base game." In such an embodiment the prizes available to the player may include a multiplier value that multiplies one or more prizes that the player may have won in the base game. Extension games with multipliers as prizes are known in the art.

As shown in the following example. FIG. 4 shows a bet slip 30 for an embodiment of the present invention as an extension game. The upper part 34 of the bet slip 30, which is not shown in detail, is filled out by the player as are the known lottery bet slips common within the art. The lower part 32 of the bet slip 30, however, is filled out in the same manner as the bet slip 10 shown in FIG. 1. The player submits the bet slip 30 along with an amount of money to cover wagers in both the base game and the extension game, using the methods described in the previous example. The lottery system accepts the wager and issues a ticket 40. FIG. 5 shows a ticket 40 for this embodiment, in the case where the lottery's placement of indicia in the geometric FIG. 42 occurs at the time of purchase. Those skilled in the art will recognize that the invention may also be embodied as an extension game where the indicia are assigned positions in the figure during a draw. FIG. 6 shows a prize table for this embodiment. In this example, the player has won a 4× multiplier. Thus, one or more prizes that are available in the base game will be multiplied by four if the player should win such a prize in the play of the base game that is documented on the upper portion of the ticket.

Figure 7:
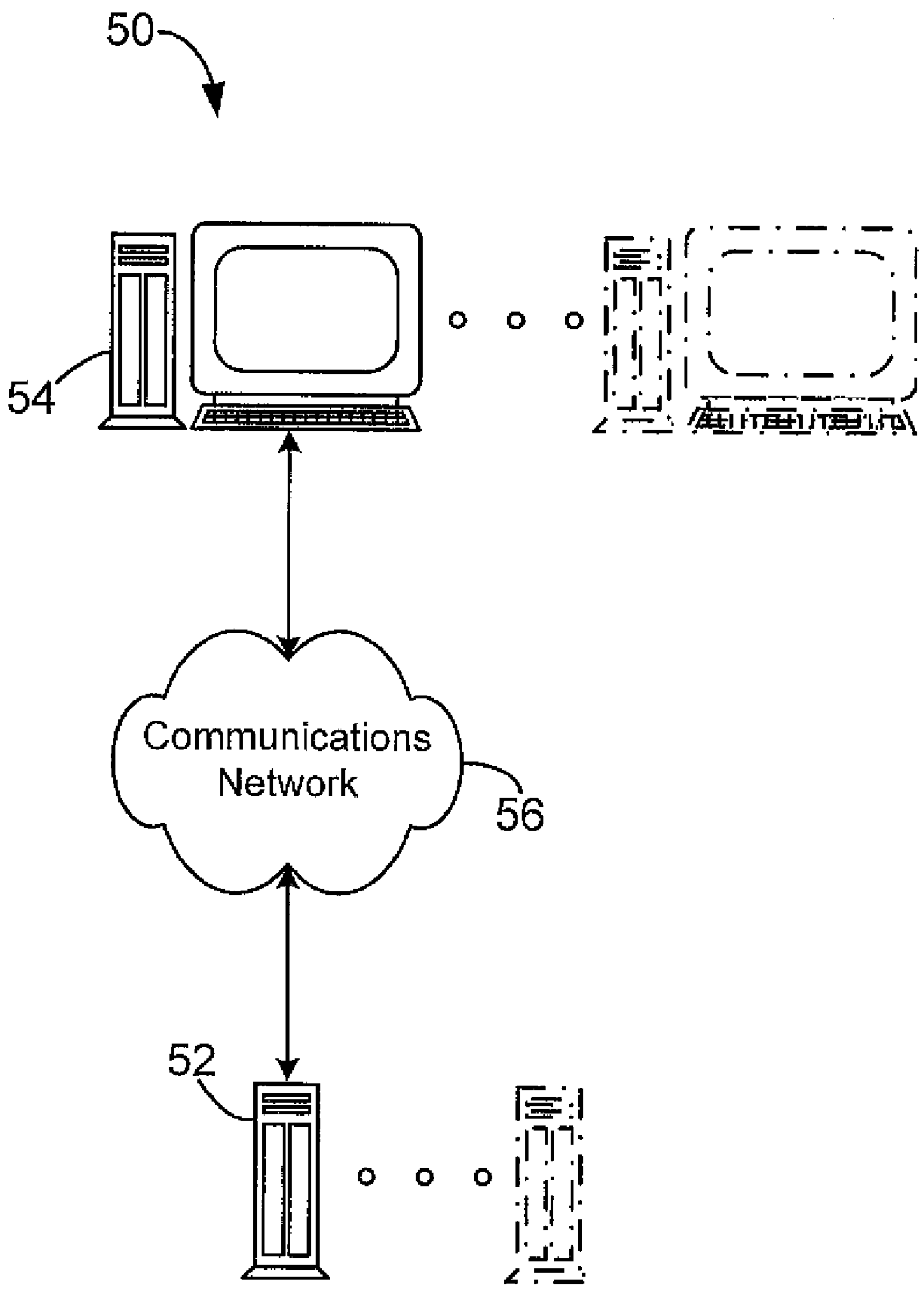
FIG. 7 is a diagram of one embodiment of a game server in communication with a game terminal issuing tickets for the inventive lottery game.

FIG. 7 is a diagram of one embodiment of a game server 52 in communication with a game terminal 54 across a network 56 issuing tickets for the inventive lottery game. The system 50 for implementing a lottery game includes at least one game server 52 that implements a lottery game using a geometric FIG. 12 having a plurality of selection spaces. At least one dispensing terminal 52 that allows a player to select at least one selection space within the geometric FIG. 12 of the lottery game implemented by the game server 52. The game server 52 populates one more of the selection spaces with one or more game indicia (27,28,29), wherein each game indicia having a point value, and the game server 52 further awards a prize to the player based upon the total number of points associated with the game indicia in the selected selection spaces.

The game terminal 54 can further providing a player a ticket having a printed matrix of selection spaces, such as bet slip 10 such that the player can select one or more selection spaces on the printed matrix of selection spaces. The game terminal 54 can also further print a ticket 20 showing the selection spaces populated with game indicia. The game server 52 can populate one or more of the selection spaces with one or more game indicia with issuance of the ticket 20, or can populates one or more of the selection spaces with one or more game indicia as the result of a draw or other random picking that is held at a predetermined time. Further, the game server can implements a second lottery game played simultaneously with the steps for implementing the lottery game using a geometric figure, such as shown in FIGS. 4 and 5.

The foregoing descriptions present only exemplary embodiments of the invention. Those of ordinary skill in the art will readily recognize that the invention may be embodied in a variety of ways by varying the geometric figures, the plurality of positions within the figure, the plurality of positions selected by the player, the symbols, the plurality of symbols, the plurality of instances of each symbol, the assignment of point values to the symbols, and the prize table. In particular it is contemplated there may be a lottery game where all the indicia are identical or have equal point values. These, and other variations of the game, are contemplated as being within the scope of the present invention.

What is claimed is:

1. A computer server-based method for implementing a lottery game, comprising:

at a game terminal configured in communication with a game server, providing a plurality of selection spaces to a player in a matrix format, the selection spaces being indistinguishable from each other except for their relative position within the matrix;

the player designating a subset of the selection spaces within the provided matrix based solely on their relative position with the matrix, the designated subset of selection spaces being less than all of the selection spaces within the matrix, the player's designation of the subset of selection spaces being done prior to game indicia being subsequently randomly assigned to selection spaces within the matrix by the game server in the following step;

after the player's designation of the subset of selection spaces, the game server randomly populating a plurality of the selection spaces in the same matrix that is less than all of the selection spaces but greater than the number of selection spaces in the player's subset of selection spaces with one or more game indicia of varying point value between negative and positive values utilizing a random drawing or random generation algorithm such that the randomly populated selection spaces are not determined as a function of the player's designated subset of selection spaces and the player's odds of winning the lottery game are predetermined and known prior to start of the lottery game by the player;

after the step of randomly populating a plurality of the selection spaces with game indicia, providing to the player a lottery ticket via the game terminal that includes the entire matrix with the player's designated subset of selection spaces and the randomly populated selection spaces with game indicia visually displayed in the matrix;

from the matrix presented on the lottery ticket, determining which ones of the player's designated subset of selection spaces correspond to any of the randomly populated selection spaces; and awarding a prize based upon the total number of points associated with the game indicia in the corresponding player's designated subset of selection spaces determined in the preceding step.

2. The method of claim 1, further comprising the step of providing the player a play slip having the matrix of selection spaces thereon for use by the player to mark their subset of selection spaces.

3. The method of claim 1, wherein the step of randomly populating a plurality of the selection spaces with one or more game indicia occurring with issuance of the lottery ticket to the player so that the player knows the outcome of the lottery game upon receipt of the lottery ticket.

4. The method of claim 1, wherein the step of randomly populating a plurality of the selection spaces with one or more game indicia occurring at a subsequent drawing event wherein the randomly selected spaces apply to a plurality of lottery tickets.

5. The method of claim 1, further comprising a second lottery game played simultaneously with the steps for implementing a lottery game using a matrix of selection spaces.

* * * * *